United States Patent
Bhatia et al.

(10) Patent No.: US 7,634,508 B2
(45) Date of Patent: Dec. 15, 2009

(54) PROCESSING OF DUPLICATE RECORDS HAVING MASTER/CHILD RELATIONSHIP WITH OTHER RECORDS

(75) Inventors: Rohit Bhatia, Hyderabad (IN); Subodh Kumar, Hyderabad (IN); Nitin Mukhija, Hyderabad (IN); Abhishek Agarwal, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 307 days.

(21) Appl. No.: 11/729,441

(22) Filed: Mar. 29, 2007

(65) Prior Publication Data

US 2008/0243967 A1    Oct. 2, 2008

(51) Int. Cl.
*G06F 17/00* (2006.01)
(52) U.S. Cl. ..................................... 707/200
(58) Field of Classification Search ........................ None
See application file for complete search history.

(56) References Cited

U.S. PATENT DOCUMENTS

| | | | |
|---|---|---|---|
| 5,303,149 A | 4/1994 | Janigian | |
| 6,961,721 B2 | 11/2005 | Chaudhuri | |
| 6,965,886 B2 | 11/2005 | Govrin | |
| 7,287,019 B2 | 10/2007 | Kapoor | |
| 2003/0220966 A1* | 11/2003 | Hepper et al. | 709/203 |
| 2004/0003005 A1* | 1/2004 | Chaudhuri et al. | 707/200 |
| 2004/0181526 A1 | 9/2004 | Burdick | |
| 2004/0220955 A1 | 11/2004 | McKee | |
| 2005/0154615 A1* | 7/2005 | Rotter et al. | 705/3 |
| 2008/0016123 A1* | 1/2008 | Devraj et al. | 707/200 |
| 2008/0052102 A1* | 2/2008 | Taneja et al. | 705/1 |
| 2008/0077573 A1 | 3/2008 | Weinberg | |

OTHER PUBLICATIONS

Muller et al, "Problems, Methods, and Challenged in Comprehensive Data Cleansing",dbis.informatik.hu-berlin.de 2005, 23 pages.*
"MerlinMerge® SpeedPro—Duplicate Detection, Merge/Purge Software," Intelligent Search Technology Ltd., Copyright © 1993-2009, 2 pages.
"Microsoft-CRM-4-0-Duplicate-Detection-Feature," Miles Consulting Corporation, Copyright © 2009, 3 pages.
"MoleskinSoft," Moleskin, Copyright © 2005-2009, 2 pages.

* cited by examiner

*Primary Examiner*—Uyen T. Le
(74) *Attorney, Agent, or Firm*—Merchant & Gould P.C.

(57) ABSTRACT

Duplicate record processing is enabled employing on customizable rules. Detected duplicate records are merged, deleted, deactivated, or moved based on one or more sets of customizable rules. Different rule sets may be used for each record type, or a rule set reused for different records. Hierarchical relationships between master and child records are adjusted upon duplicate processing based on rules and/or record attributes.

20 Claims, 5 Drawing Sheets

PROCESSING OF DUPLICATE RECORDS HAVING MASTER/CHILD RELATIONSHIP WITH OTHER RECORDS

BACKGROUND

In today's convoluted systems, data is entered into the system by different sources at different levels. This may result in having multiple representations for the same logical real world entity (e.g. contact information) due to data entry errors, varying conventions, and a variety of other reasons.

Such duplicated information may cause significant problems for users of the data. For example, it may lead to increased direct mailing costs for businesses because several customers may be sent multiple mailings. Such duplicates may cause incorrect results in analytic queries also (e.g. the number of customers in a particular location), and result in erroneous data mining models.

Since data typically grows rapidly over time, the problem of having duplicate records aggravates with time. Hence, a significant amount of time and money are spent on the task of detecting, eliminating, and handling duplicate records in a system.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to providing duplicate record processing based on customizable rules. Detected duplicate records are merged, deleted, deactivated, or moved based on one or more sets of customizable rules for each record type. According to some embodiments, hierarchical relationships between structured records may be adjusted based on record attributes.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, duplicate records are processed using customizable rules at runtime or after the records have been created. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
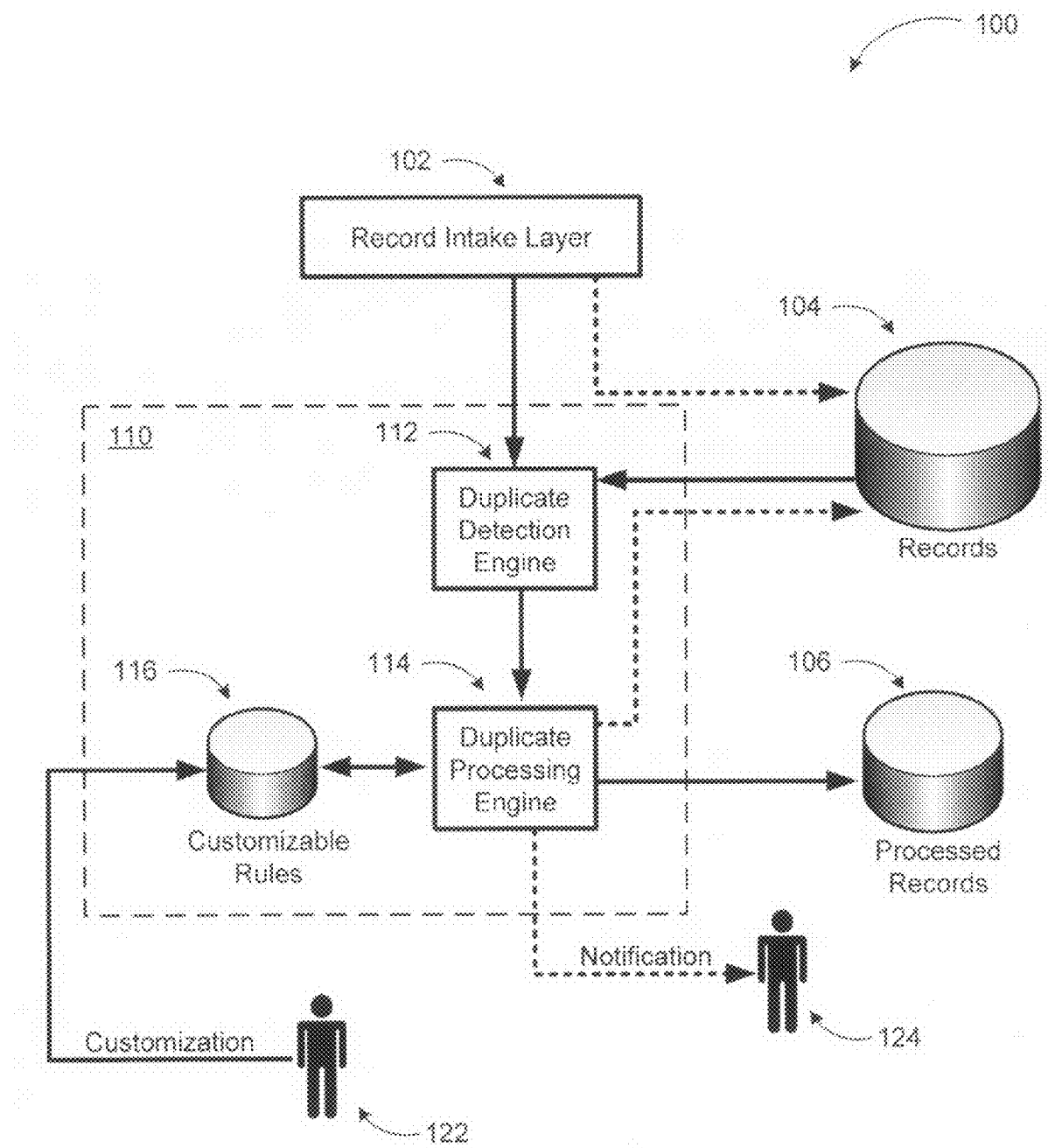
FIG. 1 illustrates an example architecture of a duplicate record handling system.

Referring to FIG. 1, an example architecture of a record processing system 100 is illustrated. Some conventional duplicate detection systems provide elimination and/or handling of duplicates by manual processing one after the other for all reported duplicate records. Quick duplicate processing, on the other hand, may allow users to define customizable rules based on which duplicates can be automatically eliminated/handled. According to some embodiments, the rules may be configured by a user for different sets of duplicates reported in the system. Thus, a duplicate processing system according to embodiments may comprise an automatic duplicate elimination/handling service and a set of rules helpful for automatically detecting relevant records and eliminate/handle the rest. The system may provide the ability to define custom rules for eliminating/handling duplicate records, duplicate elimination/handling based on attribute on preferences, and the ability to recover from automatically eliminated/handled duplicate records.

Since duplicate records can enter a system due to several reasons (data getting imported without duplicate detection, duplicate detection rule being modified, data being pumped into the system, and the like), an administrator of records may need to continuously monitor the system for duplicate records and process them. Such an analysis and monitoring of the system can be complex and time consuming. According to embodiments, an administrator may define rules for eliminating duplicates in bulk. The system may then apply that rule and try to determine most relevant record in the system and process accordingly (e.g. deactivate or delete).

According to other embodiments, the system may have pre-defined sets of rules for processing duplicates in the system. Since duplicate records could be of different type (for example: contact information, monitoring information, and the like). The user (e.g. administrator) may customize the rules in any set. Some examples of duplicate processing rules are as follows:

If duplicates are of same type then:
1. Merge all duplicate records and keep most recently modified record as active in the system (deactivate all others)
2. Merge all duplicate records and keep most recently modified active record as active in the system (deactivate all others)
3. Merge all duplicate records and keep record with maximum fields relevant to business (business recommended fields) filled as active in the system (deactivate all others)
4. Merge all duplicate records and keep the record which is mostly being referred in system as active in the system (deactivate all others)

If duplicates are of different type then:
1. Delete all duplicate records of base type
2. Delete all duplicate records of matching type
3. Deactivate all duplicate records of base type
4. Deactivate all duplicate records of matching type Furthermore, a duplicate record processing system, according to embodiments, may enable a user to set attribute level preferences for retaining relevant information from several duplicate records into one. The user may select different criteria on individual attributes to suggest which value should be carried forward in final record. For example, a value for an attribute may be taken from a duplicate record, which was modified for the selected attribute most recently meaning the most recent value for the attribute is to be taken from the records. Additionally, the user might want to keep some defaults for selected attributes or may want to specify the preferences for attribute values.

According to further embodiments, a user may be notified about the automatic duplicate processing of records owned by them such that the user can access the new record and modify if necessary. The user may also be enabled to amend the new record to fill the information from its potential duplicates reported using a context sensitive task pane within the record form.

The duplicate processing rule definitions may be customizable and reusable so that same rules can be applied to different duplicate record sets. Once the rules are defined, the user may submit a system job for processing all duplicate records based on the defined rule(s). The system may process the duplicate records based on the defined rule(s) at runtime or after at least a portion of the records have been stored. Eliminated duplicate records may be deleted from the system or moved to a duplicate queue such that individual record owners can review deactivated records.

In the example architecture of record processing system 100, records are brought into the system through record intake layer 102. Record intake layer 102 may include one or more applications, hardware, software, and combination of hardware and software for receiving records. For example, records intake layer 102 may include a sorting application that receives contact information from a number of messaging applications and sorts the records according to a pre-defined method (alphabetic, geographic, organizational, and so on). Records intake layer 102 may also provide pre-processing services such as correction of basic errors, formatting of the records, etc.

As mentioned above, duplicate processing may take place at runtime as records are being received or after at least a portion of the records are stored. Records may be stored in records data store 104, which may be implemented as a dimensional or relational database, a spreadsheet, or any other form. Thus, record intake layer 102 may store the received (and pre-processed) records in records data store 104.

Duplicate detection engine 112 is a component of duplicate processing service 110 for detecting duplicate records among the received (or stored) records. Therefore, duplicate detection engine 112 may receive records to be checked for duplication directly from record intake layer 102 or from records data store 104. Duplicate detection engine 112 provides information associated with duplicate records to duplicate processing engine 114.

Duplicate processing engine 114 may receive customizable rules from rules data store 116. According to some embodiments, rules data store 116 may include one or more sets of predefined rules, which may be customized by user 122 according to the business needs, record types, and so on.

Duplicate processing engine 114 then applies the rules deactivating, merging, updating, and the like, duplicate records. Records with duplicates eliminated may then be stored by the duplicate processing engine 114 in processed records data store 106 or in records store 104. Duplicate processing engine 114 may provide a notification in form of an electronic message, an instant message, a facsimile, a voicemail, and the like, to user 124 in response to performing a duplicate elimination task or determination of a duplicate processing rule conflict. User 124 can then take appropriate action.

The data stores shown as part of system 100 may be embodied as physical or virtual data stores comprising one or more storage media. Furthermore, individual components of the system such as duplicate detection engine 112, duplicate processing engine 114, and the like, may be implemented as individual modules or applications, as well as integrated programs. The component may also be implemented as hardware, software, or a combination of the two.

Figure 2:
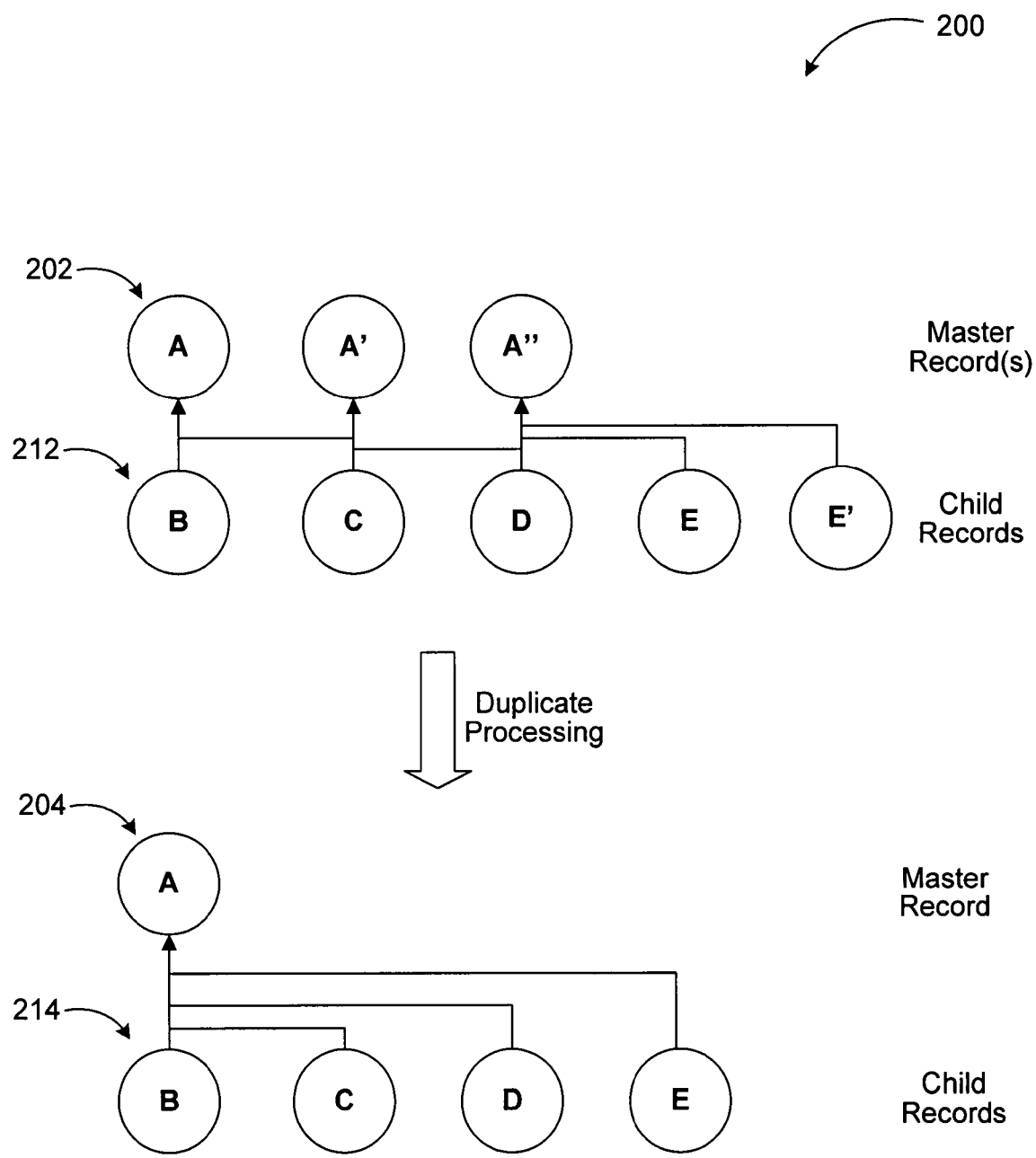
FIG. 2 illustrates elimination of duplicate records in a hierarchical data model.

FIG. 2 illustrates elimination of duplicate records in a hierarchical data model. Records in a system may have a hierarchical structure such as address, phone number, and email address components of contact information data reporting to a name component of the same data. Other, more complicated, structures are also not uncommon. When a duplicate master record is found and processed, one of the tasks is to determine the new relationship(s) between the child records and the processed master record(s).

In the example diagram of FIG. 2, child records (212) B, C, D, and E report to master record (202) A. During the initial record intake, two duplicate records for A, A' and A", are found. Additionally, a duplicate record E' for E is also found.

Following a duplicate elimination process by a duplicate processing engine such as duplicate processing engine 114 of FIG. 1, duplicate master records A' and A" are eliminated, as well as child duplicate record E'. Prior to duplicate elimination B and C may report to A, D and E may report to A', and E' may report to A". In the new hierarchy, created by the duplicate processing engine based on predefined rules and/or attributes of the records, child records B, C, D, and E report to master record A.

As discussed previously, the duplicate processing engine may use a number of criteria such as a rule that requires checking of the most recent modified attribute or checking of an active status of each record to determine which master records to eliminate and how to establish the new hierarchy.

Any number of rules may be defined for the criteria. For example, the duplicate processing engine may check is any attributes of the duplicate records are missing or empty and make its decision based on the number or type of the missing or empty attributes.

As a result of merge/delete/deactivate operations performed on the duplicate records, a particular hierarchy layer may end up with no records at all. In such a scenario, rules may be provided for the duplicate processing engine to determine a master record for any layers reporting to the empty layer (e.g. using selected attributes). For example, phone numbers for members of an organization may be hierarchically structured with individual member numbers forming a bottom layer, their group contact numbers being a next layer up, and with the organizational central number being the top master record of the structure. If one of the group contact numbers is eliminated (e.g. as a result of an attribute check such as "no longer in use"), the duplicate processing engine may be directed to connect the individual phone number records for that group to the organizational central number as their master record preserving the integrity of the hierarchical data structure. Thus, during duplicate processing according to embodiments, data may be moved around without losing the integrity of the records.

Figure 3:
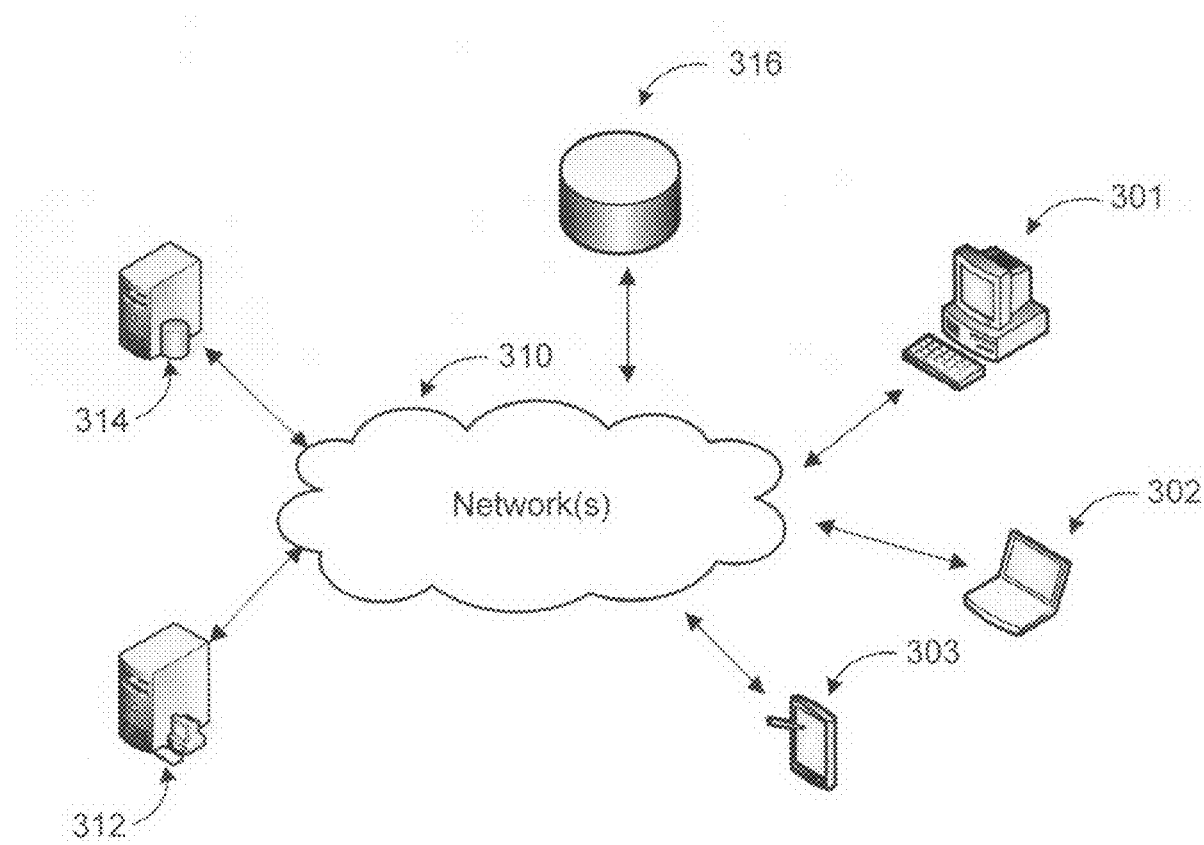
FIG. 3 is an example networked environment, where embodiments may be implemented.

FIG. 3 is an example networked environment, where embodiments may be implemented. Record handling systems and duplicate processing applications may be implemented locally on a single computing device or in a distributed manner over a number of physical and virtual clients and servers. They may also be implemented in un-clustered systems or clustered systems employing a number of nodes communicating over one or more networks (e.g. network(s) 310).

Such a system may comprise any topology of servers, clients, Internet service providers, and communication media. Also, the system may have a static or dynamic topology. The term "client" may refer to a client application or a client device. While a networked system implementing duplicate record processing employing customizable rules may involve many more components, relevant ones are discussed in conjunction with this figure.

A duplicate record processing application or module according to embodiments may be implemented in individual client devices 301-303 or executed in server 312 and accessed from anyone of the client devices (or applications). Similarly a record handling service associated with the duplicate record processing application may be executed locally in one of the client devices or, more typically, in one or more servers (e.g. server 312) and accessed by the client devices (or applications).

Data stores associated with providing duplicate record processing services within a record handling system may be embodied in a single data store such as data store 316 or distributed over a number of data stores associated with individual client devices, servers, and the like. Dedicated database servers (e.g. database server 314) may be used to coordinate data retrieval and storage in one or more of such data stores.

Network(s) 310 may include a secure network such as an enterprise network, an unsecure network such as a wireless open network, or the Internet. Network(s) 310 provide communication between the nodes described herein. By way of example, and not limitation, network(s) 310 may include wired media such as a wired network or direct-wired connection, and wireless media such as acoustic, RF, infrared and other wireless media.

Many other configurations of computing devices, applications, data sources, data distribution systems may be employed to implement duplicate record processing employing customizable rules. Furthermore, the networked environments discussed in FIG. 3 are for illustration purposes only. Embodiments are not limited to the example applications, modules, or processes.

Figure 4:
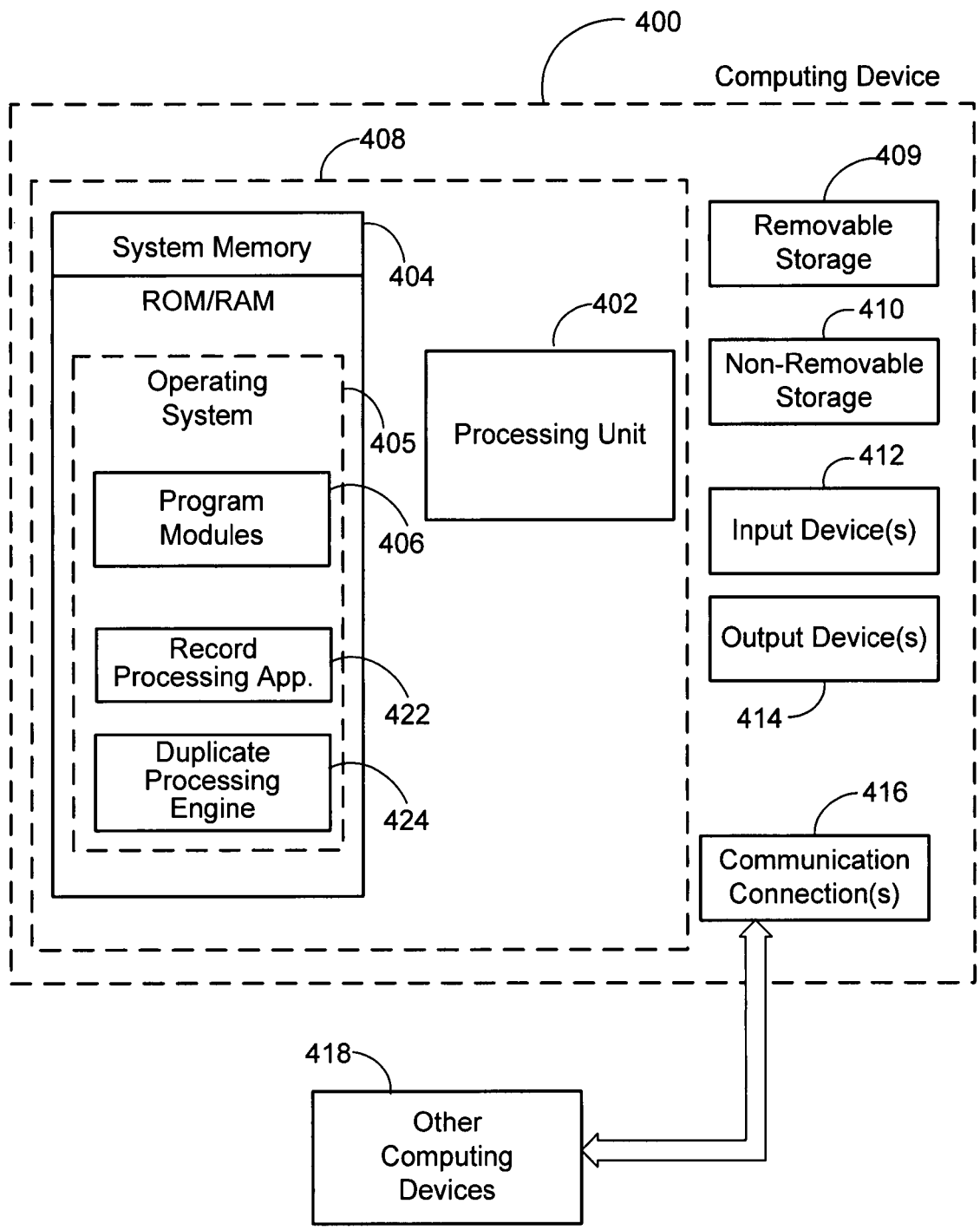
FIG. 4 is a block diagram of an example computing operating environment, where embodiments may be implemented.

FIG. 4 and the associated discussion are intended to provide a brief, general description of a suitable computing environment in which embodiments may be implemented. With reference to FIG. 4, a block diagram of an example computing operating environment is illustrated, such as computing device 400. In a basic configuration, the computing device 400 may be a server or a client device providing duplicate record processing in conjunction with a record handling service and typically include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of a networked personal computer, such as the WINDOWS® operating systems from MICROSOFT CORPORATION of Redmond, Wash. The system memory 404 may also include one or more software applications such as program modules 406, record processing application 422, and duplicate processing engine 424.

Record processing application 422 may be a separate application or an integral module of a Line Of Business (LOB) service that provides data handling and similar services to applications associated with computing device 400. Duplicate processing engine 424 may provide services associated with determining how to handle duplicate records, delete/deactivate/merge duplicate records, reestablish hierarchical relationships between records, and the like, as described previously. This basic configuration is illustrated in FIG. 4 by those components within dashed line 408.

The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by removable storage 409 and non-removable storage 410. Computer storage media may include volatile and non-volatile, removable and non-removable media implemented in any method or technology for storage of information, such as computer readable instructions, data structures, program modules, or other data. System memory 404, removable storage 409 and non-removable storage 410 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of device 400. Computing device 400 may also have input device(s) 412 such as keyboard, mouse, pen, voice input device, touch input device, etc. Output device(s) 414 such as a display, speakers, printer, etc. may also be included. These devices are well known in the art and need not be discussed at length here.

The computing device 400 may also contain communication connections 416 that allow the device to communicate with other computing devices 418, such as over a wireless network in a distributed computing environment, for example, an intranet or the Internet. Other computing devices 418 may include server(s) that execute applications associated with a record intake and duplicate processing service. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 5:
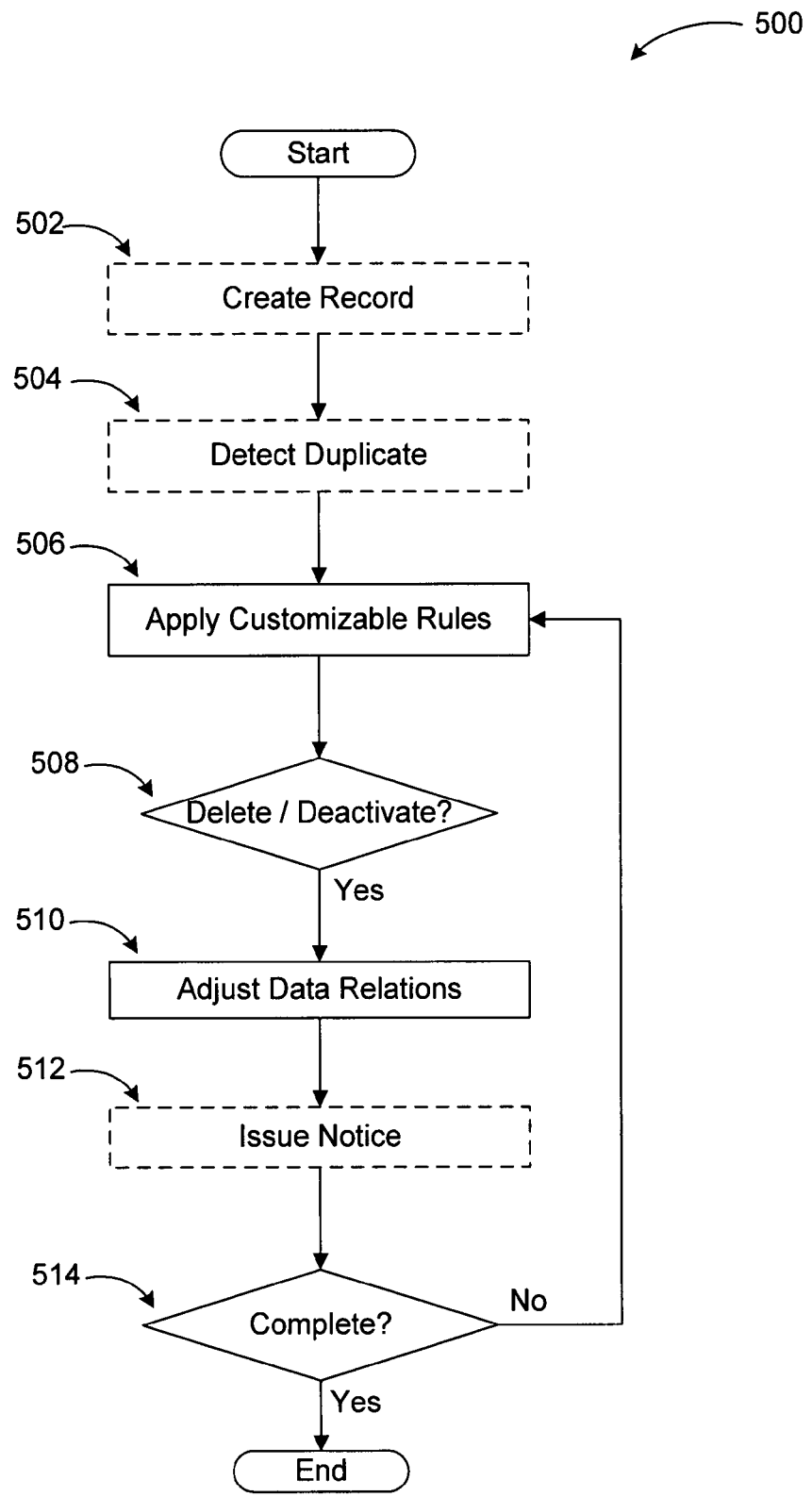
FIG. 5 illustrates a logic flow diagram for a process of processing duplicate records.

FIG. 5 illustrates a logic flow diagram for a process of processing duplicate records. Process 500 may be implemented as part of record handling system in an LOB service.

Process 500 begins with optional operation 502, where a record is created. The record may be received from another application/user, created as part of an application, or retrieved from a data store. Processing advances from optional operation 502 to optional operation 504.

At optional operation 504, a duplicate detection engine detects duplicate records and provides them to the duplicate processing engine/application. Processing continues to operation 506 from optional operation 504.

At operation 506, customizable rules are applied by the duplicate processing engine/application to eliminate, merge, or move duplicate records. Processing moves to decision operation 508 from operation 506.

At decision operation 508, a determination is made whether the duplicate records are to be deleted (deactivated). Based on the predefined or customized rules, the duplicates may be completely deleted from the system or simply deactivated such that they can be checked or reused later. If the records are to be deleted or deactivated, processing advances to operation 510.

At operation 510, data relations are adjusted. Using the rules, new hierarchical relationships between master and child records may be established. Processing moves to optional operation 512 from operation 510.

At optional operation 512, a notice is issued to a user alerting them about the deleted/deactivated records. Notices may also be issued in response to a rule conflict. The notice may be in form of an electronic mail, an instant message, a facsimile, a voicemail, or simply an on-screen alert. Processing continues to decision operation 514 from optional operation 512.

At decision operation 514, a determination is made, whether duplicate record processing of all desired records is complete. If the processing is incomplete, processing returns to operation 506 to apply relevant customizable rules to more duplicate records. If all records have been processed, processing moves to a calling process for further actions.

The operations included in process 500 are for illustration purposes. Providing duplicate record processing employing customizable rules may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for processing duplicate records, the method executed in a computing device, the method comprising:
   detecting, by the computing device, that a first record and a second record are duplicates;
   in response to detecting that the first record and the second record are duplicates, determining, at the computing device, from among a plurality of rules, at least one applicable rule for processing the first record and the second record;
   applying, by the computing device, the applicable rule to determine whether to eliminate the first record or the second record;
   when the first record is to be eliminated:
      eliminating, by the computing device, the first record; and
      modifying, by the computing device, an attribute of each record in a first set of records such that each record in the first set of records indicates a master/child relationship with the second record, the first set of records comprising records having attributes that initially indicated a master/child relationship with the first record; and
   when the second record is to be eliminated:
      eliminating, by the computing device, the second record; and
      modifying, by the computing device, an attribute of each record in a second set of records such that each record in the second set of records indicates a master/child relationship with the first record, the second set of records comprising records having attributes that initially indicated a master/child relationship with the second record.

2. The method of claim 1,
   wherein the method further comprises: receiving, at the computing device, a plurality of records for processing, the plurality of records including the first record; and
   wherein applying, by the computing device, the applicable rule comprises applying, by the computing device, the applicable rule as the computing device is receiving the plurality of records.

3. The method of claim 1,
   wherein the method further comprises receiving, at the computing device, a plurality of records for processing, the plurality of records including the first record; and
   wherein applying, by the computing device, the applicable rule comprises applying, by the computing device, the applicable rule after the computing device stores at least a portion of the plurality of records in a records data store.

4. The method of claim 1, wherein eliminating the first record includes one of deleting, deactivating, and moving the first record.

5. The method of claim 4, wherein eliminating the first record further includes merging, by the computing device, the first record with the second record.

6. The method of claim 1, further comprising:
providing, by the computing device, a notification to a user when the computing device eliminates the first record.

7. The method of claim 6,
wherein the notification is one of: an electronic mail message, an instant message, a facsimile, a voicemail, and an on-screen alert;
wherein each record in the first set of records comprises a phone number of a member of a hierarchical organization.

8. The method of claim 1,
wherein the first set of records comprises a master record, the master record being a master of the first record; and
wherein modifying, by the computing device, the attribute of each record in the first set of records comprises:
modifying, by the computing device, the attribute of the master record to indicate that the master record is a master of the second record.

9. The method of claim 1,
wherein the first set of records comprises a child record, the child record being a child of the first record;
wherein modifying, by the computing device, the attribute of each record in the first set of records comprises:
modifying, by the computing device, the attribute of the child record to indicate that the child record is a child of the second record.

10. The method of claim 1, wherein the applicable rule includes one of:
merge duplicate records of same type keeping most recently modified record as active and deactivating remaining duplicate records;
merge duplicate records of same type keeping most recently modified active record as active and deactivating remaining duplicate records; and
merge duplicate records of same type keeping a record with a maximum number of business recommended fields as active and deactivating remaining duplicate records.

11. The method of claim 1, wherein the applicable rule includes one of:
delete duplicate records of a base type;
delete duplicate records of a matching type;
deactivate duplicate records of a base type; and
deactivate duplicate records of a matching type.

12. A computer system for processing duplicate records, comprising:
a system memory storing computer-executable instructions; and
a microprocessor coupled to the system memory, the microprocessor is configured to execute the computer-executable instructions, the computer-executable instructions, when executed by the microprocessor, cause the computer system to:
receive a plurality of records, the plurality of records comprising a first record and a second record;
detect that the first record and the second record are duplicates;
determine, from among a plurality of rules, at least one applicable rule for processing the first record and the second record;
apply the applicable rule to determine whether to eliminate the first record or the second record, and when the first record is to be eliminated:
eliminate the first record;
modify an attribute of each record in a first set of records such that each record in the first set of records indicates a master/child relationship with the second record, the first set of records comprising records having attributes that initially indicated a master/child relationship with the first record; and
store the second record and the first set of records in a records data store; and
when the second record is to be eliminated:
eliminate the second record; and
modify an attribute of each record in a second set of records such that each record in the second set of records indicates a master/child relationship with the first record, the first set of records comprising records having attributes that initially indicated a master/child relationship with the second record; and
storing the first record and the second set of records in the records data store.

13. The computer system of claim 12, further comprising a rules data store that stores the plurality of rules, wherein each rule in the plurality of rules is customizable by a user.

14. The computer system of claim 13, wherein the records data store and the rules data store comprise one of a relational database, a dimensional database, and a spreadsheet.

15. The computer system of claim 12, further comprising a record intake module that receives the plurality of records from one of a record generation application and the records data store.

16. The computer system of claim 12, wherein the instructions, when executed by the microprocessor, further cause the computer system to:
provide a notification to a user based on one of a delete, a deactivation, and a move operation performed on the first record, the notification being at least one of: an electronic mail, an instant message, a facsimile, a voicemail, and an on-screen alert; and
provide notification to the user regarding duplicate records moved to a duplicate record queue to enable the user to review and determine an action on the duplicate records moved to the duplicate record queue.

17. The computer system of claim 12,
wherein the first set of records comprises a master record, the master record being a master of the first record;
wherein the first set of records comprises a child record, the child record being a child of the first record;
wherein the computer-executable instructions, when executed by the microprocessor, further cause the computer to:
modify the attribute of the master record to indicate that the master record is a master of the second record; and
modify the attribute of the child record to indicate that the child record is a child of the second record.

18. A computer storage medium with instructions stored thereon for processing duplicate records, the instructions, when executed by a microprocessor of a computer, cause the computer to:
store a plurality of rules in a rules data store, each rule in the plurality of rules being customizable by a user:
receive a plurality of records for processing from a record generation application,
the plurality of records comprising a first record and a second record,
the plurality of records comprising a first child record that is a child of the first record, the plurality of records comprising a first master record that is a master of the first record, the plurality of records comprising a second child record that is a child of the second record, and the plurality of records comprising a second master record that is a master of the second record;

detect, after receiving the plurality of records, that the first record and the second record are duplicates;

in response to detecting that the first record and the second record are duplicates, determine, from among the plurality of rules, at least one applicable rule for processing the first record and the second record;

store at least a portion of the plurality of records in a records data store;

apply, after determining the applicable rule and after storing at least the portion of the plurality of records, the applicable rule to determine whether to eliminate the first record or the second record;

when the first record is to be eliminated:

perform one of a delete, a deactivate, a move, and a merge operation on the first record;

modify an attribute of the first child record to indicate that the first child record is a child of the second record;

modify an attribute of the first master record to indicate that the first master record is a master of the second record;

store the second record, the first child record, and the first master record in the records data store; and provide a first notification to the user that the first record has been eliminated; when the second record is to be eliminated;

perform one of a delete, a deactivate, a move, and a merge operation on the second record;

modify an attribute of the second child record to indicate that the second child record is a child of the first record;

modify an attribute of the second master record to indicate that the second master record is a master of the first record;

store the first record, the second child record, and the second master record in the records data store; and provide a second notification to the user that the second record has been eliminated.

19. The computer storage medium of claim 18, wherein the instructions, when executed by the microprocessor, further cause the computer to:

enable the user to perform one of: setting an attribute level preference for retaining relevant information from a plurality of duplicate records into a single record and defining a default value for at least one attribute.

20. The computer storage medium of claim 19, wherein the applicable rule is a customizable rule associated with a type of the first record.

* * * * *